United States Patent
Long

(10) Patent No.: US 10,638,657 B2
(45) Date of Patent: May 5, 2020

(54) LID PROP SYSTEM FOR AN AGRICULTURAL IMPLEMENT TANK

(71) Applicant: CNH America LLC, New Holland, PA (US)

(72) Inventor: Scott A. Long, Plainfield, IL (US)

(73) Assignee: CNH Industrial America LLC, New Holland, PA (US)

( * ) Notice: Subject to any disclaimer, the term of this patent is extended or adjusted under 35 U.S.C. 154(b) by 1359 days.

(21) Appl. No.: 13/737,903

(22) Filed: Jan. 9, 2013

(65) Prior Publication Data

US 2014/0190375 A1 Jul. 10, 2014

(51) Int. Cl.
*A01C 15/00* (2006.01)

(52) U.S. Cl.
CPC .................................. *A01C 15/006* (2013.01)

(58) Field of Classification Search
CPC .......... E05C 17/04; E05C 17/14; E05C 17/16; E05C 17/24; E05C 17/28; A01C 15/006
USPC .................. 220/326, 249, 831, 832
See application file for complete search history.

(56) References Cited

U.S. PATENT DOCUMENTS

| | | | | |
|---|---|---|---|---|
| 1,057,774 A | * | 4/1913 | Rich | E05C 17/28 217/60 C |
| 1,264,310 A | * | 4/1918 | Ledwinka | 296/76 |
| 1,592,508 A | * | 7/1926 | Sweet | E05C 17/28 292/262 |
| 1,737,397 A | | 11/1929 | Williamson | |
| 2,130,185 A | * | 9/1938 | Jacobs | E05C 17/24 217/60 C |

(Continued)

FOREIGN PATENT DOCUMENTS

| | | |
|---|---|---|
| DE | 345937 | 3/1921 |
| DE | 478707 C | 7/1929 |

(Continued)

OTHER PUBLICATIONS

Hardware Tree, Pair of drop front desk lid stays L&R hand SX-8532ALWLRH, http://www.hardwaretree.com/proddetail.php?prod=SX-8532ALWLRH, Last Accessed Apr. 15, 2016.

*Primary Examiner* — Anthony D Stashick
*Assistant Examiner* — Blaine G Neway
(74) *Attorney, Agent, or Firm* — Rebecca L. Henkel; Richard K. DeMille

(57) ABSTRACT

A seed tank assembly for an agricultural implement including a support rod with a first end and a second end, in which the first end is configured to couple to a first side of an opening in a seed tank, the second end is configured to couple to a second side of the opening in the seed tank, and the support rod includes a trough. The support rod is configured to provide structural support to the seed tank. The seed tank assembly further including a prop rod with a first end and a second end, in which the first end is slidably coupled to the support rod, the second end is configured to attach to a tank lid, the tank lid is configured to rotate from a closed position to a fully open position, and the tank lid forms an obtuse angle with the opening while in the fully open position. The trough is configured to block movement of the first end of the prop rod while the first end of the prop rod is engaged with the trough to hold the tank lid in the fully open position.

14 Claims, 4 Drawing Sheets

(56) References Cited

U.S. PATENT DOCUMENTS

| | | | | |
|---|---|---|---|---|
| 2,811,173 A | * | 10/1957 | Benson | F16J 3/047 |
| | | | | 29/454 |
| 3,420,570 A | * | 1/1969 | Kunz | B62D 33/08 |
| | | | | 217/60 R |
| 3,940,009 A | * | 2/1976 | Szeles | B25H 3/022 |
| | | | | 220/563 |
| 4,083,596 A | * | 4/1978 | Robertson | B60J 7/1621 |
| | | | | 296/100.1 |
| 4,522,440 A | * | 6/1985 | Gostomski | B60P 7/02 |
| | | | | 296/100.07 |
| 4,925,223 A | | 5/1990 | Craft | |
| 5,947,033 A | | 9/1999 | Lombardo | |
| 6,292,978 B1 | | 9/2001 | Lakoduk et al. | |
| 6,932,396 B2 | | 8/2005 | Masseth, Jr. et al. | |

FOREIGN PATENT DOCUMENTS

| | | | |
|---|---|---|---|
| DE | 531661 | C | 8/1931 |
| DE | 7436224 | | 2/1975 |
| DE | 2548304 | A1 | 5/1977 |
| DE | 8303056 | U1 | 7/1983 |
| GB | 168613 | A | 9/1921 |

\* cited by examiner

LID PROP SYSTEM FOR AN AGRICULTURAL IMPLEMENT TANK

BACKGROUND

The invention relates generally to ground working equipment, such as agricultural equipment, and more specifically, to a lid prop system for an agricultural implement tank.

Generally, planting implements (e.g., planters) are towed behind a tractor or other work vehicle via a mounting bracket secured to a rigid frame of the implement. These planting implements typically include multiple row units distributed across the width of the implement. Each row unit is configured to deposit seeds at a desired depth beneath the soil surface, thereby establishing rows of planted seeds. For example, each row unit may include a ground engaging tool or opener (e.g., an opener disc) that forms a seeding path for seed deposition into the soil. In certain configurations, a gauge wheel is positioned a vertical distance above the opener to establish a desired trench depth for seed deposition into the soil. As the implement travels across a field, the opener excavates a trench into the soil, and seeds are deposited into the trench. In certain row units, the opener is followed by a packer wheel that packs the soil on top of the deposited seeds.

Certain planting implements include a central seed tank, and a pneumatic distribution system configured to convey seeds from the tank to each row unit. For example, the pneumatic distribution system may include an inductor box positioned beneath the seed tank. The inductor box is configured to receive seeds from the tank, to fluidize the seeds into an air/seed mixture, and to distribute the air/seed mixture to the row units via a network of pneumatic hoses/conduits. Each row unit, in turn, receives the seeds from the pneumatic hoses/conduits, and directs the seeds to a metering system. The metering system is configured to provide a flow of seeds to a seed tube for deposition into the soil. By operating the metering system at a particular speed, a desired seed spacing may be established as the implement traverses a field.

The central seed tank may be filled with seeds through an opening on top of the seed tank. To retain the seeds within the seed tank, to block foreign objects from entering the seed tank, and to facilitate pressurization of the tank, the opening is covered by a lid. In certain configurations, the lid is configured to rotate from a closed position to a fully open position approximately, 180 degrees from the closed position. In such configurations, it may difficult for an operator to reach the open lid to facilitate lid closure. In addition, if the opening angle of the lid is limited (e.g., by a blocking device), the wind may catch the lid and cause it to close inadvertently.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a seed tank assembly for an agricultural implement includes a support rod with a first end and a second end, in which the first end is configured to couple to a first side of an opening in a seed tank, the second end is configured to couple to a second side of the opening in the seed tank, and the support rod includes a trough. The support rod is configured to provide structural support to the seed tank. The seed tank assembly further includes a prop rod with a first end and a second end, in which the first end is slidably coupled to the support rod, the second end is configured to attach to a tank lid, the tank lid is configured to rotate from a closed position to a fully open position, and the tank lid forms an obtuse angle with the opening while in the fully open position. The trough is configured to block movement of the first end of the prop rod while the first end of the prop rod is engaged with the trough to hold the tank lid in the fully open position.

In a second embodiment, a seed tank assembly for an agricultural implement includes a seed tank body configured to store seeds for the agricultural implement, in which the seed tank body includes an opening configured to facilitate filling the seed tank body with seeds. The seed tank assembly further includes a tank lid configured to rotate between a closed position that substantially covers the opening, and a fully open position that facilitates access to the seed tank body through the opening, in which the tank lid forms an obtuse angle with the opening while the tank lid is in the fully open position. The seed tank assembly further includes at least one support rod extending across the opening and configured to provide structural support to the seed tank body, in which the at least one support rod includes a trough. The seed tank assembly further includes a prop rod extending between the support rod and the tank lid, in which the prop rod is configured to slide along the support rod, and the trough is configured to block movement of the prop rod along the support rod while the prop rod is engaged with the trough to block rotation of the tank lid from the fully open position.

In a third embodiment, a seed tank assembly for an agricultural implement includes a seed tank body configured to store seeds for the agricultural implement, in which the seed tank body includes an opening configured to facilitate filling the seed tank body with seeds. The seed tank assembly further includes a tank lid configured to rotate between a closed position that substantially covers the opening, and a fully open position that facilitates access to the seed tank body through the opening, in which the tank lid forms an obtuse angle with the opening while the tank lid is in the fully open position. The seed tank assembly further includes at least one support rod extending across the opening and configured to provide structural support to the seed tank body, in which the at least one support rod includes a trough. The seed tank assembly further includes a prop rod extending between the support rod and the tank lid, in which the prop rod is configured to slide along the support rod, and the trough is configured to block movement of the prop rod along the support rod while the prop rod is engaged with the trough to block rotation of the tank lid from the fully open position and to enable the prop rod to disengage the trough via upward movement of the prop rod to facilitate rotation of the tank lid from the fully open position to the closed position.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
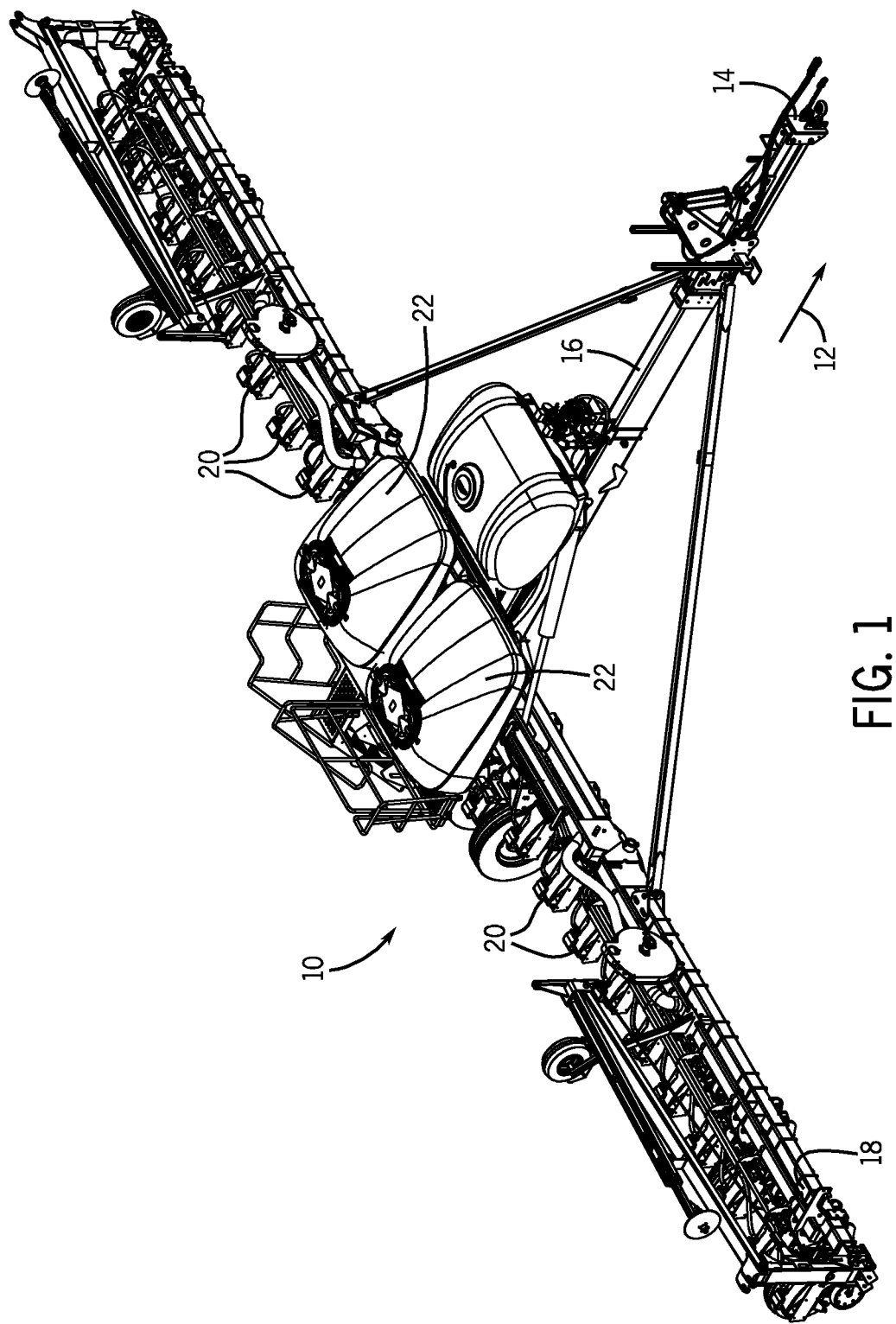
FIG. 1 is a perspective view of an embodiment of an agricultural implement configured to deposit seeds into a soil surface.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Various embodiments of the present disclosure include a central seed tank for a planting implement. The seed tank includes an opening configured to enable an operator to pour seeds into the tank. In order to retain the seeds within the seed tank, to block foreign objects from entering the seed tank, and to facilitate pressurization of the tank, the opening is covered by a lid. The seed tank may be used to supply seeds to a planting implement having 24 rows, for example. Thus, the seed tank may be of substantial size (e.g. 3 feet tall and 6 feet across). In order to efficiently fill the seed tank, the area of the opening may be almost 700 square inches. Therefore, a 700 square inch lid may be utilized to cover the tank opening. With a lid and a tank of this magnitude, it may be difficult for an operator to reach the seed tank lid to rotate the lid from an open position to a closed position. In addition, due to the large surface area of the lid, the lid may catch the wind, while in the open position, and cause the lid to close inadvertently.

Accordingly, one disclosed embodiment provides a seed tank assembly for an agricultural implement including a body configured to store seeds for the agricultural implement. The body includes an opening configured to facilitate filling the seed tank with seeds. The seed tank assembly further including a tank lid configured to rotate between a closed position that substantially covers the opening, and a fully open position that facilitates access to the seed tank through the opening. The tank lid forms an obtuse angle with the opening while in the fully open position. The seed tank assembly further includes at least one support rod extending across the opening and configured to provide structural support to the seed tank, in which the at least one support rod includes a trough. The seed tank assembly further includes a prop rod extending between the support rod and the tank lid, in which the prop rod is configured to slide along the support rod, and the trough is configured to block movement of the prop rod along the support rod while the prop rod is engaged with the trough to block rotation of the lid from the fully open position. The lid may be configured to open to an obtuse angle, such as 120 degrees, to enhance access to the opening. In addition, the prop rod may reduce the possibility of inadvertent lid closure by blocking lid rotation via engagement with the trough. In other words, if the wind blows against the lid, the prop rod may block rotation of the lid, thereby holding the lid in the fully open position.

FIG. 1 is a perspective view of an embodiment of an agricultural implement 10 configured to deposit seeds into a soil surface. In the illustrated embodiment, the implement 10 is configured to be towed along a direction of travel 12 by a work vehicle, such as a tractor or other prime mover. The work vehicle may be coupled to the implement 10 by a hitch assembly 14. As illustrated, the hitch assembly 14 is coupled to a main frame assembly 16 of the implement 10 to facilitate towing of the implement 10 in the direction of travel 12. In the illustrated embodiment, the frame assembly 16 is coupled to a tool bar 18 that supports multiple row units 20. Each row unit 20 is configured to deposit seeds at a desired depth beneath the soil surface, thereby establishing rows of planted seeds. The implement 10 also includes seed tanks 22, and a pneumatic distribution system configured to convey seeds from the tanks to the row units 20. In certain embodiments, the pneumatic distribution system includes an inductor box positioned beneath each seed tank 22. Each inductor box is configured to receive seeds from a respective tank, to fluidize the seeds into an air/seed mixture, and to distribute the air/seed mixture to the row units 20 via a network of pneumatic hoses/conduits.

In certain embodiments, each row unit 20 includes a residue manager, an opening assembly, a seed tube, closing discs, and a press wheel. The residue manager includes a rotating wheel having multiple tillage points or fingers that break up crop residue, thereby preparing the soil for seed deposition. The opening assembly includes a gauge wheel and an opener disc. The gauge wheel may be positioned a vertical distance above the opener disc to establish a desired trench depth for seed deposition into the soil. As the row unit travels across a field, the opener disc excavates a trench into the soil for seed deposition. The seed tube, which may be positioned behind the opening assembly, directs a seed from a metering system into the excavated trench. The closing discs then direct the excavated soil into the trench to cover the planted seed. Finally, the press wheel packs the soil on top of the seed with a desired pressure.

While the illustrated implement 10 includes 24 row units 20, it should be appreciated that alternative implements may include more or fewer row units 20. For example, certain implements 10 may include 6, 8, 12, 16, 24, 32, or 36 row units, or more. In addition, the spacing between row units may be particularly selected based on the type of crop being planting. For example, the row units may be spaced 30 inches from one another for planting corn, and 15 inches from one another for planting soy beans.

Figure 2:
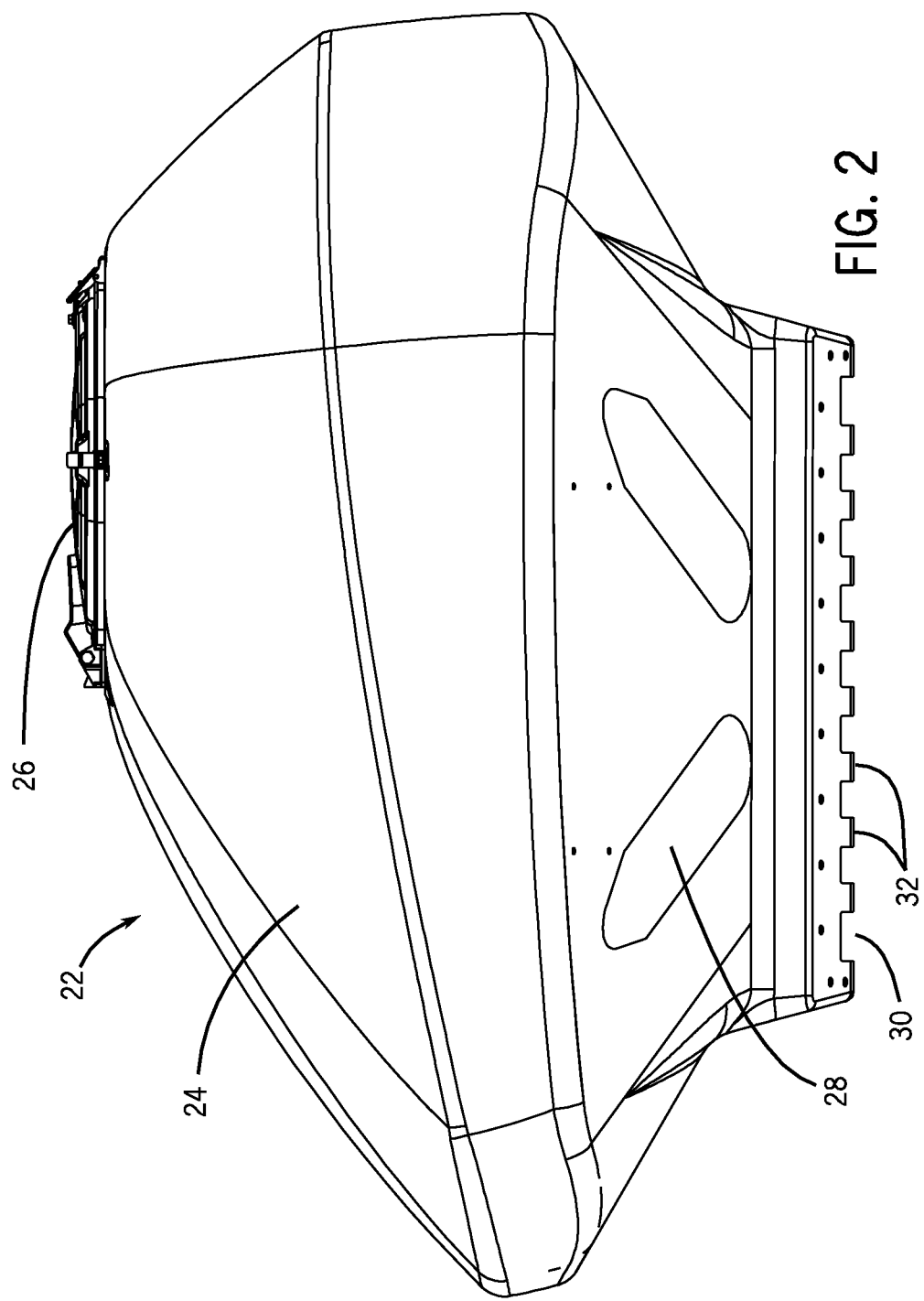
FIG. 2 is a side view of an embodiment of a seed tank as shown in FIG. 1, showing a seed tank body and a seed tank lid.

FIG. 2 is a side view of an embodiment of the seed tank 22, as shown in FIG. 1, showing a seed tank body 24 and a lid 26. In the depicted embodiment, the seed tank 22 includes a body 24, a lid 26, and an opening. The body 24 is configured to store seeds for distribution to the row units 20. For example, the body 24 may be 3 feet tall, 6 feet wide, and configured to store 3.5 tons of seeds. The seed tank body 24 may be molded from a single piece of polyethylene (e.g. via a rotational molding process). However, it should be appreciated that the seed tank body 24 may be molded from other types of thermoplastics or thermosets, such as polypropylene, polystyrene, polyvinyl chloride, or polytetrafluoroethylene. As described above, the lid 26 is configured to substantially cover an opening used to fill the seed tank 22. In the depicted embodiment, the lid 26 and the opening are located on a top portion of the seed tank 22. However, it should be appreciated that the lid 26 and the opening may be located in any other suitable position on the body 24 that enables an operator to fill the seed tank 22. It should be appreciated that it may be beneficial to use a light weight material, such as fiberglass, for the lid 26 to facilitate opening and closing the lid 26. Made from fiberglass, the lid 26 may weigh between 5-10 pounds. In the depicted embodiment, the seed tank 22 also includes ribs 28 molded into the seed tank 22, an outlet 30 configured to expel seed from the seed tank 22, and webbings 32 across the outlet 30. A more detailed look at an embodiment of the lid 26 may be seen in FIG. 3.

Figure 3:
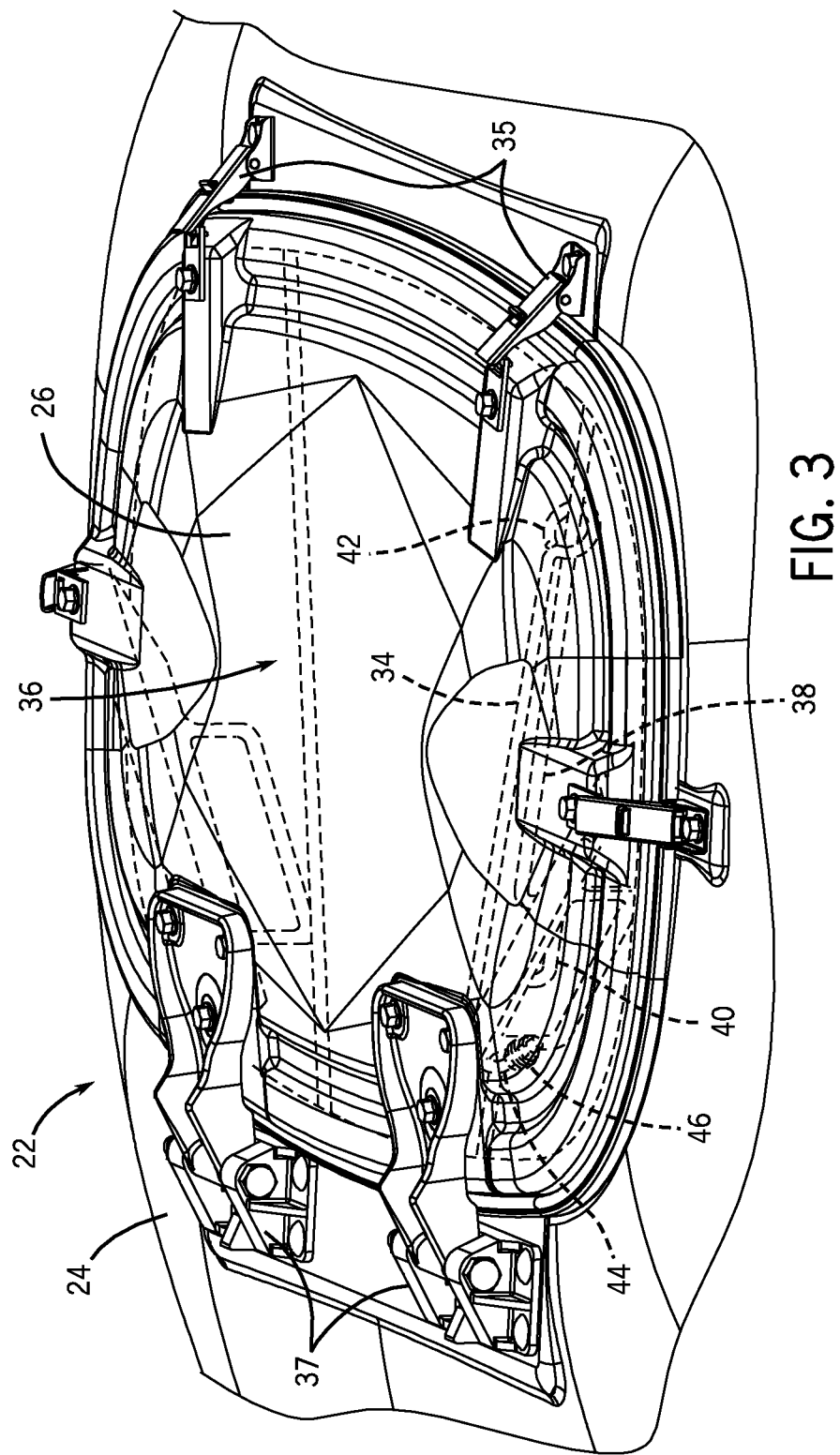
FIG. 3 is a top view of the seed tank of FIG. 2, showing the seed tank lid in a closed position.

FIG. 3 is a top view of the seed tank 22 of FIG. 2 showing the seed tank lid 26 in a closed position. As described above, the lid 26 is configured to substantially cover an opening 36. In the depicted embodiment, clips 35 are configured to secure the lid 26 to the body 24 while the lid 26 is in the closed position. In other words, the clips 35 may reduce the possibility of the lid 26 opening inadvertently during operation of the implement. In the illustrated embodiment, the clips 35 are connected to the body 24 and extend from the body 24 over the lid 26. The clips 35 may be spring loaded to hold the lid in the closed position, and to facilitate opening of the lid. In addition, in the depicted embodiment, hinges 37 attach the lid 26 to the body 24, and facilitate rotation of the lid 26 from the closed position to the fully open position, and vice versa.

In the depicted embodiment, a support rod 38 extends across the opening 36 and is configured to provide structural support to the seed tank 22. As previously described, the body 24 may be of significant size and molded from polyethylene, which is a resilient material. Accordingly, the support rod 38 provides structural support to the tank. A first end of the support rod 38 is coupled to a first side of the opening 36, and a second end of the support rod 38 is coupled to a second side of the opening 36. Although the support rod 38 extends across the opening 36, the support rod does not significantly interfere with seed flow through the opening 36 due to the small diameter of the support rod 38. For example, a suitable material for the support rod 38 may be 0.79 cm (5/16$^{th}$ inch) metal wire, which may provide structural support while minimally interfering with seed flow through the opening 36. The support rod 38 may be installed in the seed tank 26 during the manufacturing process.

In the depicted embodiment, the support rod 38 includes a trough 40. The depicted trough 40 is formed by a rectangular bend in the support rod 38. It should be appreciated that the trough 40 may be other shapes such as triangular in alternative embodiments. In addition, the trough 40 may be formed in the support rod 38 before the support rod 38 is installed in the seed tank 22.

As depicted, the prop rod 34 includes an eyelet 42 and a hook 44. The eyelet 42 is configured to couple the prop rod 34 to the support rod 38. In the depicted embodiment, the eyelet 42 wraps around the support rod 38. The hook 44 is configured to attach the prop rod 34 to the lid 26. In the depicted embodiment, the prop rod 34 is attached to the lid with nuts 46. In the depicted embodiment, the prop rod 34 is configured to be captive by the support rode and by the lid. In other words, there are no free parts in the tank assembly 22 because in the closed position, in the fully open position, and while transitioning between positions, the prop rod 26 is connected to both the support rod 38 and the lid 26. Similar to the support rod 38, the prop rod 34 may be 0.79 cm metal wire. The prop rod 34 may be attached to both the support rod 38 and the lid 26 during the manufacturing process.

Figure 4:
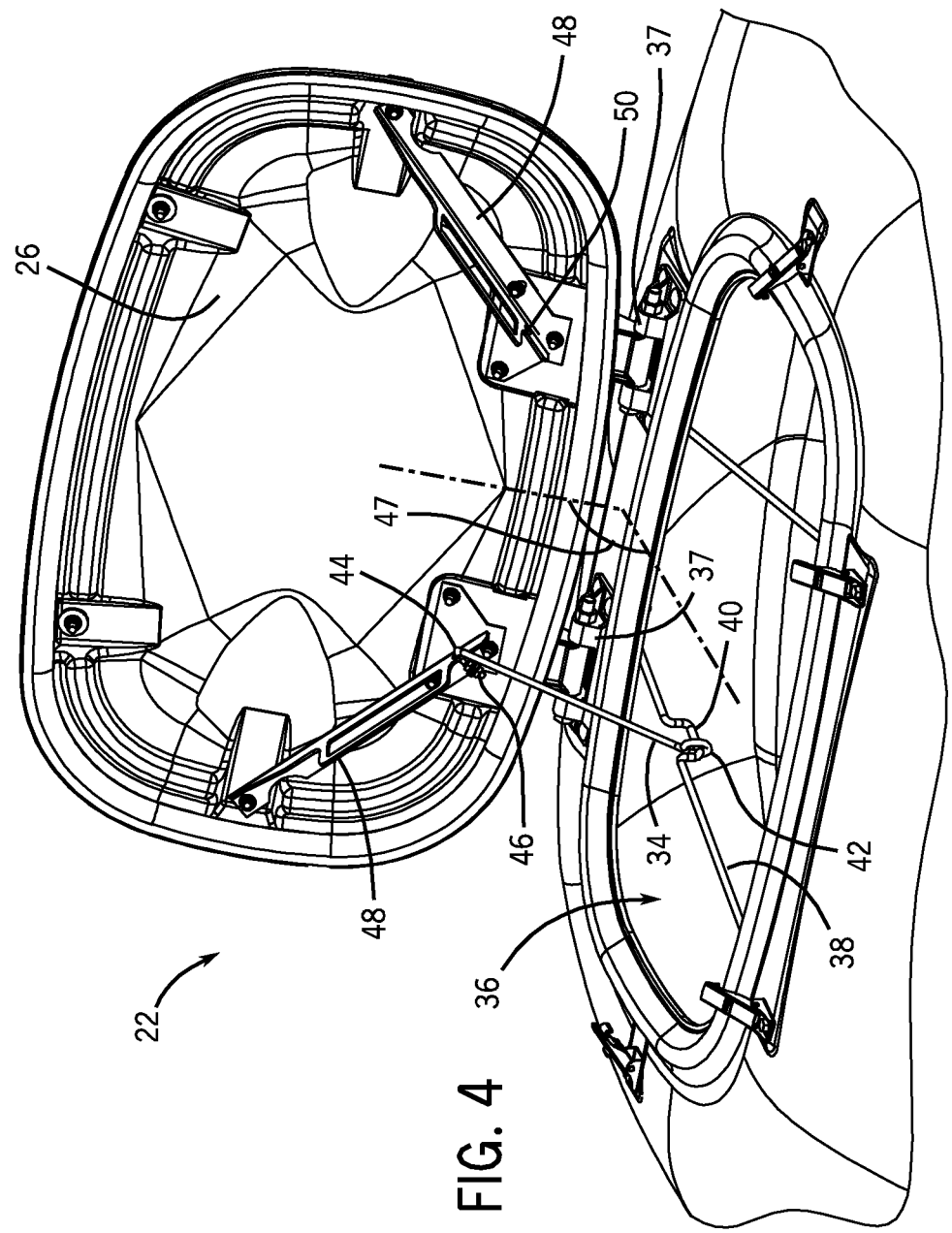
FIG. 4 is a perspective view of the seed tank of FIG. 2, showing the seed tank lid in a fully open position.

FIG. 4 is a perspective view of the seed tank of FIG. 2, showing the seed tank lid 26 in a fully open position. As described above, in the fully open position, the lid 26 may open to an obtuse angle 47. The angle 47 may be between 91-120, 121-150, or 151-179 degrees. Enabling the lid 26 to open to the obtuse angle 47 may facilitate filling the seed tank 22 by providing enhanced access to the opening. Thus, the operator may have more room to perform operations in the seed tank 22, such as filling the seed tank 22 with seeds. In addition, limiting the angle 47 enables the lid 26 to be more easily closed than lids 26 configured to open to 180 degrees. Comparatively, the present technique enables the operator to exert less energy to close the lid 26 because the lid 26 has a shorter distance to travel. In addition, as described above, the seed tank 22 may be of substantial size, thereby making the open lid difficult for an operator to reach. At the obtuse angle 47, the lid 26 may be closer to the operator, thereby making the lid 26 easier to reach.

As described above, the prop rod 34 is a captive system. In the depicted fully open position, the prop rod 34 remains connected to the support rod 38 by the eyelet 42. The eyelet 42 enables the prop rod 34 to slide along the support rod 38. In the depicted fully open position, the prop rod 34 also remains connected to the lid 26 by the hook 44, the nuts 46, and a lid brace 48. The lid brace 48 may be bolted to the lid 26 and configured to provide structural support to the lid. The hook 44 may interface with an opening 50 in the lid brace 48 and be secured within the opening 50 by the nuts 46. Accordingly, the prop rod 34 pivots relative to the lid brace 48 as the lid 26 rotates.

In order to lessen the chances of the lid 26 closing inadvertently, the trough 40 is configured to block movement of the prop rod 34 along the support rod 38 while the prop rod 34 is engaged with the trough 40, thereby blocking rotation of the lid 26 from the fully open position. As depicted, the motion of the lid 26 is tied to the motion of the prop rod 34. Thus, as the lid 26 rotates from the closed position, the lid 26 drives the prop rod 34 to slide along the support rod 38. When the lid 26 reaches the fully open position, the prop rod 34 engages the trough 40. In the depicted embodiment, the prop rod 34 drops into the trough 40. It should be appreciated that the lid 26 may be opened with one hand because the prop rod 34 may automatically drop into the trough 40 when the lid reaches the fully open position. While the prop rod 34 is in the trough, rotation of the lid 26 is blocked by contact between the prop rod 34 and the trough 40. In the depicted configuration, if a strong wind blows against the lid 26, the lid 26 pushes against the prop rod 34, which in turn pushes against a side of the trough 40, thereby blocking rotation of the lid 26 and reducing the possibility of the lid closing inadvertently.

In addition, the trough 40 is configured to enable the prop rod 34 to disengage the trough 40 via upward movement of the prop rod 34 to facilitate rotation of the lid 26 from the fully open position to the closed position. In the depicted embodiment, in order to rotate the lid 26 from the fully open position, the prop rod 34 may be lifted out of the trough 40, which enables the prop rod 34 to slide along the support rod 38. As described above, the seed tank 22 may be of substantial size, which may make it difficult for the operator to reach the lid 26. Instead of pulling on the lid 26, the lid 26 may be closed using the prop rod 34. In other words, the prop rod 34 may act as a grab handle. As described above, rotation of the lid 26 is tied to the movement of the prop rod 34. For example, in the depicted embodiment, after the prop rod 34 is lifted out of the trough 40, the operator may rotate the lid 26 to the closed position by pulling on the prop rod 34. The prop rod 34 may be closer to the operator, which makes it easier for the operator to reach. In addition, the lid 26 may be closed with one hand because the prop rod 34 may be lifted out of the trough 40 and pulled along the support rod 38 with one hand.

It should be appreciated that the present lid prop system may be added to existing seed tanks 22. Existing seed tanks may include a support rod and a lid brace. Thus, a kit to modify existing seed tanks 22 may include the support rod 38 including the trough 40. The kit may further include the prop rod 34 the first end slidably coupled to the support rod 38 and the second end configured to attach to the lid brace 48. The kit may be installed by coupling the support rod 38 to the tank body, and coupling the prop rod 34 to the lid brace 48. The trough 40 is configured to block movement of the first end of the prop rod 34 while the first end of the prop rod 34 is engaged with the trough 40 to keep the lid in the fully open position.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural implement comprising:
a seed tank body configured to store agricultural product before distribution by the agricultural implement, wherein the seed tank body comprises a first opening configured to provide access to an interior portion of the seed tank body;
a first support rod configured to provide structural support to the seed tank body, wherein the first support rod spans the first opening and comprises:
a first end coupled to a first side of the first opening in the seed tank body;
a second end coupled to a second side of the first opening in the seed tank body; and
a trough formed between the first end and the second end of the first support rod at a location overlapping the first opening;
a tank lid pivotably connected to the seed tank body via a hinge; and
a prop rod comprising:
a third end rotatably coupled to the tank lid; and
a fourth end slidably coupled to the first support rod, wherein the fourth end is configured to:
slide along the first support rod across the first opening toward the hinge as the tank lid transitions toward a fully open position to enable opening the tank lid at an obtuse angle relative to the first opening in the seed tank body; and
engage the trough while the tank lid is in the fully open position to hold the tank lid in the fully open position by limiting movement of the prop rod along the first support rod.

2. The agricultural implement of claim 1, wherein:
the fourth end of the prop rod comprises an eyelet; and
the first support rod extends through the eyelet.

3. The agricultural implement of claim 1, wherein the third end of the prop rod comprises a hook that extends through a second opening in the tank lid.

4. The agricultural implement of claim 3, comprising a tank lid brace that extends across the tank lid, wherein:
the tank lid brace comprises the second opening; and
the hook is configured to be secured to the tank lid brace by a nut.

5. The agricultural implement of claim 1, wherein the obtuse angle is about 120 degrees.

6. The agricultural implement of claim 1, comprising a second support rod configured to provide structural support to the seed tank body, wherein the second support rod comprises:
a fifth end coupled to the first side of the first opening; and
a sixth end coupled to the second side of the first opening.

7. The agricultural implement of claim 1, wherein the prop rod is configured to enable an operator to transition the tank lid to a closed position by moving the fourth end of the prop rod along the first support rod away from the hinge.

8. A seed tank assembly configured facilitate distribution of an agricultural product by an agricultural implement, comprising:
a seed tank body configured to store agricultural product before distribution, wherein the seed tank body comprises an opening configured to facilitate inputting the agricultural product to an interior portion of the seed tank body;
a tank lid rotatably coupled to the seed tank body via a hinge, wherein the tank lid is configured to:
substantially cover the opening while in a closed position; and
provide access to the interior portion of the seed tank body through the opening at least while in a fully open position;
a first support rod spanning the opening, wherein the first support rod comprises:
a first portion extending from a first side of the opening to a second side of the opening to provide structural support to the seed tank body; and
a trough formed in the first portion of the first support rod and overlapping the opening, wherein the trough and the opening are on a same side of the tank lid; and
a prop rod rotatably coupled to the tank lid at a first end and slidably coupled to the first support rod at a second end, wherein the second end of the prop rod is configured to:
slide along the first portion of the first support rod toward the hinge as the tank lid is transitioned toward the fully open position to enable opening the tank lid at an obtuse angle relative to the opening in the seed tank body; and
engage the trough while the tank lid is in the fully open position, wherein the trough is configured to block movement of the second end of the prop rod along the first support rod when engaged with the prop rod to block the tank lid from transitioning from the fully open position.

9. The seed tank assembly of claim 8, wherein:
the second end of the prop rod comprises an eyelet disposed about the first support rod, wherein the eyelet is captive on the first support rod; and
the first end of the prop rod comprises a hook coupled to the tank lid.

10. The seed tank assembly of claim 8, comprising:
a clip configured to secure the tank lid in the closed position; and
a second support rod spanning the opening, wherein the second support rod comprises a second portion extending from the first side of the opening to the second side of the opening to provide structural support to the seed tank body.

11. The seed tank assembly of claim 8, wherein the obtuse angle is about 120 degrees.

12. The seed tank assembly of claim 8, wherein:
the tank lid comprises a first material; and
the seed tank body comprises a second material different from the first material.

13. The seed tank assembly of claim 8, wherein the prop rod is captive on the first support rod.

14. The seed tank assembly of claim 8, wherein the second end of the prop rod is configured to disengage the trough via an upward movement of the prop rod to enable the tank lid to transition from the fully open position.

* * * * *